United States Patent
Rossi et al.

(10) Patent No.: US 6,767,479 B1
(45) Date of Patent: Jul. 27, 2004

(54) CROSS-LINKING MIXTURES OF BETA-HYDROXYALKYLAMIDE AND COMPOUND OF FORMULA (II) AND THEIR USE THEREOF

(75) Inventors: Pietro Paolo Rossi, Garlasco (IT); Gino Marelli, Albavilla (IT); Alberto Baldini, Garlasco (IT)

(73) Assignee: SIR Industriale S.p.A., Casei Gerola (IT)

( * ) Notice: Subject to any disclaimer, the term of this patent is extended or adjusted under 35 U.S.C. 154(b) by 0 days.

(21) Appl. No.: 09/936,461

(22) PCT Filed: Feb. 4, 2000

(86) PCT No.: PCT/EP00/00902

§ 371 (c)(1),
(2), (4) Date: Mar. 27, 2002

(87) PCT Pub. No.: WO00/55266

PCT Pub. Date: Sep. 21, 2000

(30) Foreign Application Priority Data

Mar. 12, 1999 (IT) .......................................... MI99A0511

(51) Int. Cl.⁷ .................... C09D 167/00; C09D 133/06; C09D 5/03; C08G 69/08
(52) U.S. Cl. .................. 252/182.26; 106/436; 106/401; 528/288; 528/292; 528/272; 528/296; 525/50; 525/418; 525/420
(58) Field of Search ...................... 252/182.26; 106/436, 106/401; 528/288, 292, 272, 274, 296, 367; 525/50, 418, 420

(56) References Cited

U.S. PATENT DOCUMENTS 3,932,324 A * 1/1976 Stretanski .................. 524/223
4,398,002 A * 8/1983 Bertram et al. ............. 525/523
4,675,443 A * 6/1987 Bertram et al. ............. 564/155
4,801,680 A   1/1989 Geary et al.
5,101,073 A * 3/1992 Schlaefer .................... 564/137
5,840,822 A * 11/1998 Lee et al. ..................... 528/44
5,858,549 A * 1/1999 Kielbania et al. ........ 428/474.4
2003/0195373 A1 * 10/2003 Manea et al. ................. 560/41

FOREIGN PATENT DOCUMENTS

WO        WO 94/03545        2/1994

OTHER PUBLICATIONS

Abstract No.39963 from CHEMLIST re CAS Reg. No. 68368–33–2 (2000).

* cited by examiner

Primary Examiner—Joseph D. Anthony
(74) Attorney, Agent, or Firm—Morgan & Finnegan, L.L.P.

(57) ABSTRACT

Described herein are mixtures of cross-linking agents for the preparation of powder paints wherein the binder consists of polyester resins having free carboxyl groups. The cross-linking mixture itself comprises at least one Beta-hydroxyalkylamide compound having a Beta-hydroxy functional of 4 and at least one compound of formula (II)

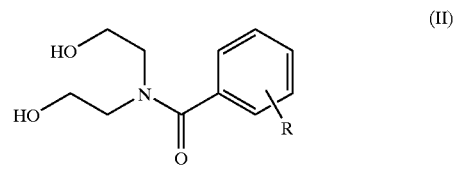

(II)

where R is linear or branched $C_2$–$C_{10}$ alkyl group having a Beta-hydroxy functionality of 2, wherein said cross-linked mixture has a mean Beta-hydroxy functionality of between 2.1 and 3.9.

15 Claims, 5 Drawing Sheets

CROSS-LINKING MIXTURES OF BETA-HYDROXYALKYLAMIDE AND COMPOUND OF FORMULA (II) AND THEIR USE THEREOF

This application is a 371 of PCT/EP00/00902 filed Feb. 4, 2000.

SCOPE OF THE INVENTION

The present invention regards mixtures of β-hydroxyalkyl amides and their use as cross-linking agents in the field of powder paints.

STATE OF THE ART

The use of β-hydroxyalkyl amides as thermosetting agents in the field of paints is well known, and in particular the use of tetrafunctional β-hydroxyalkyl amides, for example the β-hydroxyalkyl amide of adipic acid of formula (I) given below.

These compounds are mainly used in the preparation of polyester resin-based powder paints, where the resins have free carboxyl groups, a field in which β-hydroxyalkyl amides present remarkable and advantageous cross-linking properties: the thermosetting reaction, which consists in the electrification between the hydroxyl groups of the β-hydroxyalkyl amide and the carboxyl groups of the polyester resin according to the following scheme:

in fact takes place at a lower temperature than do normal esterification reactions between alcohols and carboxylic acids. Thanks to the activation of the hydroxyl group by the amide group in position β, this reaction takes place already starting from 150° C., thus making possible the use of β-hydroxyalkyl amides in the technology for the manufacture of thermosetting powder paints, where the "baking" temperatures of the paints are usually between 140 and 220° C.

Against these advantageous characteristics, β-hydroxyalkyl amides, when used as cross-linking agents for polyester polymers with free carboxyl groups, develop water to the extent of approximately 4 mol/mol of cross-linking agent, and this causes surface flaws, such as "pinholes" and "craters" in the film of painting product.

The reaction water that forms within the layer of paint in fact develops after the formation of the film, when the electrification reaction takes place. On account of the high temperatures involved, the water comes out in the form of vapour, tearing the film and creating bubbles.

These surface defects appear to a larger extent, the greater the thickness of the film. In this connection it is known that, in the sector of powder paints, in order to obtain films devoid of surface flaws, it is necessary to maintain the thickness of the film below 100 μm by means of a rigorous control of the thicknesses applied in the phase of electrostatic spraying.

This represents a considerable drawback, since a control of this kind is not always possible when shaped items are coated, on which at the pointed parts and edges the rise in the electric field causes larger thicknesses of paint to be deposited.

To limit this phenomenon, degassing additives are generally used, which, by favouring the expulsion of gas and/or water, limit the formation of surface flaws in the film of paint.

The European patent application No. EP-A-322 834 (PPG Ind. Inc.), for example, describes a thermosetting-powder painting composition, based on amorphous polyester resins having free carboxyl groups, which contains tetrafunctional β-hydroxyalkyl amides as cross-linking agents.

After they have been applied on metal substrates, these powder paints are subjected to thermosetting by means of heating in an oven at a temperature between 150 and 200° C.

To remove the air that remains entrapped in the film following on the fusion of the powder paint during the thermosetting process, a degassing agent is added, in particular benzoin.

The composition described in EP-A-322 834 in any case does not appear to be suited for the preparation of white paints, light-coloured paints or transparent paints, in that, when undergoing thermosetting, it presents a certain degree of darkening, which increases as the quality of benzoin added, the temperature, and the stoving time increase.

According to EP-A-322 834, the quantity of benzoin required for guaranteeing a good degassing effect ranges between 0.6 and 0.8%, and this causes a marked yellowing of the paint during the "baking" phase.

With lower quantities of benzoin, on the other hand, the critical thickness of the film, i.e., the maximum thickness obtainable without the presence of any surface defects, decreases considerably: a reduction in the quantity of benzoin in 0.2% in order to guarantee a low degree of yellowing of the paint causes the appearance of surface flaws already in a film having a thickness of 80–90 μm.

These attempts thus highlight the impossibility of obtaining a film having a thickness >100 μm free from surface flaws starting from polyester resin-based compositions, where the resins have free carboxyl groups, comprising β-hydroxyalkyl amides as cross-linking agents, unless degassing additives are added, with consequent increase in the cost and complexity of the preparation process, and also with a consequent worsening, as has already been said, of the optical properties of the paint obtained.

The use of tetrafunctional β-hydroxyalkyl amides alone as cross-linking agents of polyester resins having free carboxyl groups presents another problem, linked to the great difference of polarity between cross-linking agent and polyester resin, which renders difficult the homogenization between the two compounds during preparation of the powder paint.

Since a poor homogenization of the two compounds then results in lower mechanical and aesthetic characteristics of the end product (the surface of the film that has hardened may, for example, be unevenly spread and be affected by the so-called "orange peel" phenomenon), it is necessary to carry out mixing by melting in an extruder in drastic operating conditions, i.e., at high temperatures and high speeds of the extruder screw, and at times to resort to double extrusion.

An attempt to overcome these drawbacks has been made by DSM NV, which, in the European patent application No. EP-A-652 911, describes the use of N,N-(2-hydroxyethyl) acetamide in combination with a tetrafunctional β-hydroxyalkyl amide as cross-linking agent. Albeit presenting a certain effectiveness in favouring degassing during the cross-linking phase, this compound is very soluble in water and at the temperature of use in liquid. These characteristics render N,N-(2-hydroxyethyl)acetamide practically unusable in the field of powder paints having a base of carboxylated polyester resins: Its incorporation in the mixture of solids that make up the raw material for preparing the powder paint proves in fact particularly problematical and, during storage of the end product, this compound tends to migrate as liquid component, causing sintering of the powder grains.

The problem therefore remains open of having available polyester resin-based thermosetting powder paint compositions, where the resins have free carboxyl groups, containing β-hydroxyalkyl amides as thermosetting agents, which do not require the use of high quantities of degassing additives and do not present the disadvantages described above for the known products, at the same time maintaining good mechanical and aesthetic characteristics.

SUMMARY OF THE INVENTION

Now the applicant has found that the use, as cross-linking agent, of a mixture comprising at least two β-hydroxyalkyl amides having a different β-hydroxyalkyl amide functionality in suitable molar ratios presents unexpected advantages in the production of polyester resin-based thermosetting powder paints, where the resins have carboxyl groups.

These cross-linking mixtures have in fact proved effective in favouring the expulsion of the water that forms in the course of the cross-linking process, and have no presented problems of incorporation and homogenization in the steps of processing and storage of powder paints, thus enabling paint films to be obtained that are free from surface flaws at thicknesses of over 130 μm, and moreover have good mechanical characteristics and good characteristics of gloss, adherence and resistance to atmospheric agents.

The subject of the present invention is therefore a cross-linking mixture for polymers having free carboxyl groups which is suitable for the preparation of powder paints and comprises at least two compounds having β-hydroxyalkyl amide groups, characterized in that it has a mean β-hydroxyalkyl amide functionality of between 2.1 and 3.9.

The powder paint containing the said cross-linking mixture and the process for its preparation constitute further subjects of the present invention.

The characteristics and advantages of the β-hydroxyalkyl amide mixtures as cross-linking agents according to the present invention will be illustrated in detail in the ensuing description.

BRIEF DESCRIPTION OF THE FIGURES

X indicates the curve obtained for the paint of Example 3 when the angle of incidence of light is 60°.

□ indicates the curve obtained for the paint of Example 4 (comparison) when the angle of incidence of light is 60°.

◇ indicates the curve obtained for the paint of Example 3 when the angle of incidence of light is 20°.

Δ indicates the curve obtained for the paint of Example 4 (comparison) when the angle of incidence of light is 20°.

X indicates the curve obtained for the paint of Example 5 when the angle of incidence of light is 60°.

□ indicates the curve obtained for the paint of Example 6 (comparison) when the angle of incidence of light is 60°.

Δ indicates the curve obtained for the paint of Example 5 when the angle of incidence of light is 20°.

◇ indicates the curve obtained for the paint of Example 6 (comparison) when the angle of incidence of light is 20°.

DETAILED DESCRIPTION OF THE INVENTION

By β-hydroxyalkyl amide functionality in the present invention is meant the number of β-hydroxyalkyl amide groups per molecule of cross-linking agent, whilst the mean number of β-hydroxyalkyl amide groups of the cross-linking mixture is defined as mean β-hydroxyalkyl amide functionality.

By critical thickness of the film in the present invention is meant the maximum thickness of the paint the film may be obtained without surface flaws being formed, such as bubbles, craters or pinholes.

The cross-linking mixture that is the subject of the present invention comprises at least two compounds having β-hydroxyalkyl amide groups, and is characterized in that it has a mean β-hydroxyalkyl amide functionality of between 2.1 and 3.9, preferably of between 2.2 and 3.8.

This cross-linking mixture preferably comprises at least one compounds having a β-hydroxyalkyl amide functionality of four and at least one compound having a β-hydroxyalkyl amide functionality of two.

Among the compounds with a functionality of four, the β-hydroxyalkyl amide of adipic acid, or N,N,N',N'-tetrakis-(2-hydroxyethyl) adipamide, of formula (I) given below, is particularly suited for the implementation of the present invention:

Suitable compounds with a β-hydroxyalkyl amide functionality of two are the compounds of formula (II)

where R is a linear or branched $C_2$–$C_{10}$ alkyl group.

The substituent R may be in the ortho-, metha- or para-position with respect to the carbonyl, and preferably is in the para-position.

According to a preferred embodiment of the present invention, the compound with a β-hydroxyalkyl amide functionality of two is defined by formula (II) given above, in which R is a branched alkyl group, and more preferably R is chosen in the group consisting of t-butyl, i-propyl and pentyl.

Particularly preferred for the embodiment of the present invention is the compound of formula (II) in which the substituent R is t-butyl and is found in the para-position with respect to the carbonyl.

The compound of formula (II) in which the substituent R is t-butyl in the para-position with respect to the carbonyl represents a further subject of the present invention.

These compounds are characterized by low solubility in water and a low polarity that makes them more compatible with the polyester resin, and do not release any odours or harmful substances when hot-mixed with the polyester resin. These compounds of formula (II), either by themselves or mixed with the compound of formula (I), are hence particularly suited for the preparation of powder paints having a base of carboxylated polyester resins.

The present β-hydroxyalkyl amide compounds of formula (II) can be prepared by reaction of the corresponding alkylbenzoic acid or of one of its derivatives, for example the chloride or the ester of the acid, with diethanolamine.

This reaction is conducted in an organic solvent, for example in toluene, at temperatures of between 10 and 40 C. The purification of the end product is carried out via one or more washings with water.

The mixture of β-hydroxyalkyl amides that form the subject of the present invention are suited for use as cross-linking agents for polymers with free carboxyl groups, and more in particular for carboxylated polyester resins, for example polyester resins having a numeric mean molecular weight $M_n$ of between 1000 and 6000, preferably of between 2000 and 3500.

Polymers suitable for the purpose of the present invention have an acid number of between 15 and 100 mg of KOH per g of resin, preferably of between 25 and 50 mg of KOH per g of resin, and a glass transition temperature of between 35 and 90° C., preferably of between 50 and 70° C.

The polyesters used for the preparation of the powder paints according to the present invention may be prepared with the usual technique of polymerization by polycondensation of aromatic or aliphatic polyfunctional carboxylic acids, or of their derivatives, with glycols or polyglycols, in a ratio such that the resulting polyester is prevalently terminated by carboxylic acid groups.

Examples of polycarboxylic acids suitable for the preparation of the said polyester resins are aromatic acids, such as terephthalic acid, isophthalic acid, phthalic acid, and 1,2,4-benzenetricarboxylic acid, and aliphatic acids, such as succinic acid, adipic acid, tetrahydrophthalic acid, hexahydrophthalic acid, maleic acid, fumaric acid, and cyclohexanedicarboxylic acid.

Examples of polyfunctional alcohols suitable for the preparation of the present polyester resins are mono- and polyethylene glycols, mono- and polypropylene glycols, neopentyl glycol, 2-methyl-1,3-propylene glycol, hydroxypivalyl hydroxypivalate, 2-butyl-2-ethyl-1,3-propylene glycol, cyclohexanedimethanol, 1,4-butanediol, 1,3-butanediol, 1,2-butanediol, 1,2-hexanediol and 1,6-hexanediol, glycerol, trimethylolpropane, trimethylolethane and penta-erythritol.

Polyesters suitable for the implementation of the present invention are, for example, the commercial products Sirales PE 178® and Sirales PE 278®.

The resin Sirales PE 178® has the following characteristics:

acid number: 35 mg of KOH per g of resin hydroxyl number: 5 mg of KOH per g of resin viscosity at 200° C. (ICI cone/plate): 4250 mPa•s glass transition temperature $T_g$: 66.5° C.

The resin Sirales PE 278® has the following characteristics:

acid number: 35 mg of KOH per g of resin hydroxyl number: 10 mg of KOH per g of resin viscosity of 200° C. (ICI one/plate): 5500 mPa•s glass transition temperature $T_g$: 62.2° C.

The composition of the present powder paints is such that the molar ratio between the total hydroxyls of the β-hydroxyalkylamide compounds of the cross-linking mixture and the carboxyl groups of the polyester resin is between 2:3 and 3:2.

The process of preparation of the powder pain according to the present invention comprises the following steps:

i) mixing of the polyester binder with the cross-linking agent, and optionally with suitable additives, in a mixer;

ii) hot-feeding of the mixture obtained in step i) into a single- or double-screw extruder, preferably at a temperature of between 80 and 140° C., with the extruder screw not heated and screw speed lower than 120 rpm;

iii) grinding and sieving of the melted product obtained from the extruder in the previous step so as to obtain powder paint with a particle size of less than 150 μm, preferably of less than 100 μm.

The β-hydroxyalkylamide cross-linking agents may be intimately pre-mixed together and added in step i) as a mixture, or may be added in step i) separately. The bifunctional cross-linking agent of formula (II) according to the present invention possesses low solubility in water and a lower polarity than does the tetrafunctional β-hydroxyalkyl amide of formula (I), and this bestows on it better affinity for the carboxylated polyester resins with low polarity used for the preparation of the powder paint, thus also rendering less problematical the mixing in the extruder of the paint components.

In other words, in the implementation of the present invention it is not necessary to adopt extreme extrusion conditions and to supply high mechanical energy in order to make the polyester resins compatible with the cross-linking mixture so as to obtain a good spread of the paint film, and indeed good results are obtained also with the extrusion screw now heated and with screw speeds lower than 60 rpm.

The applicant has moreover surprisingly found that the use of the said bifunctional β-hydroxyalkyl amides of formula (I) in combination with tetrafunctional β-hydroxyalkyl amides of formula (I) as cross-linking agents in the preparation of powder paints favours the removal of the reaction water, thus reducing the formation of surface flaws, i.e., thus making it possible to increase the film thickness at which these flaws appear to over 130 μm as against the 80–90 μm of the paints of the prior art which contain only the tetrafunctional cross-linking agent, even when the operation is carried out with a quantity of 0.2% of benzoin degassing additive.

In addition to having a high critical thickness, the powder paints obtained with the present cross-linking mixture present good mechanical characteristics and good characteristics of gloss and adherences.

The powder paint compositions comprising the β-hydroxyalkyl amide mixture according to the present invention as cross-linking agent are suitable for painting items made of the widest variety of materials. In addition, since they present a considerable resistance to atmospheric agents, these paints are particularly suited for use in painting outdoor items and structures.

Besides the polyester binder and the cross-linking mixture, the present powder paints may also contain the additives commonly used in this field, such as mineral charges, pigments, spreading agents and degassing agents.

The above-mentioned characteristics of the present paints have been evaluated by subjecting the paints to the usual aesthetic assessments and to the determinations of the mechanical characteristics according to the international standards applied in the sector of powder paints.

The examples that follow are given to provide a non-limiting illustration of the present invention.

EXAMPLE 1

Preparation of N,N-(2-hydroxethyl)-4-t-butylbenzamide of formula (II) in which R is 4-t-butyl 197 g (1 mol) of 4-t-butylbenzoic acid chloride are drip-fed in 3 hours in a suspension consisting of 231 g (2.2 mol) of diethanolamine and 340 g of toluene, keeping up sustained stirring and operating at a temperature lower than 20° C. At the end of this addition, the reaction mixture is left under stirring for a further 3 hours at the same temperature, and then 200 g of water are added, still under stirring, until complete precipitation of the amide. The crystalline precipitate thus obtained is filtered; then it is washed with approximately 300 g of water until a neutral pH is achieved and so as to obtain a content of impurities consisting of diethanolamine hydrochloride and diethanolamine of less than 0.1%.

The solid product thus obtained is vacuum-dried at 50–60° C. In this way, 246 g (0.93 mol) of N,N-(2-hydroxyethyl)-4-t-butylbenzamide are obtained (melting point: 89–90° C.).

Figure 1:
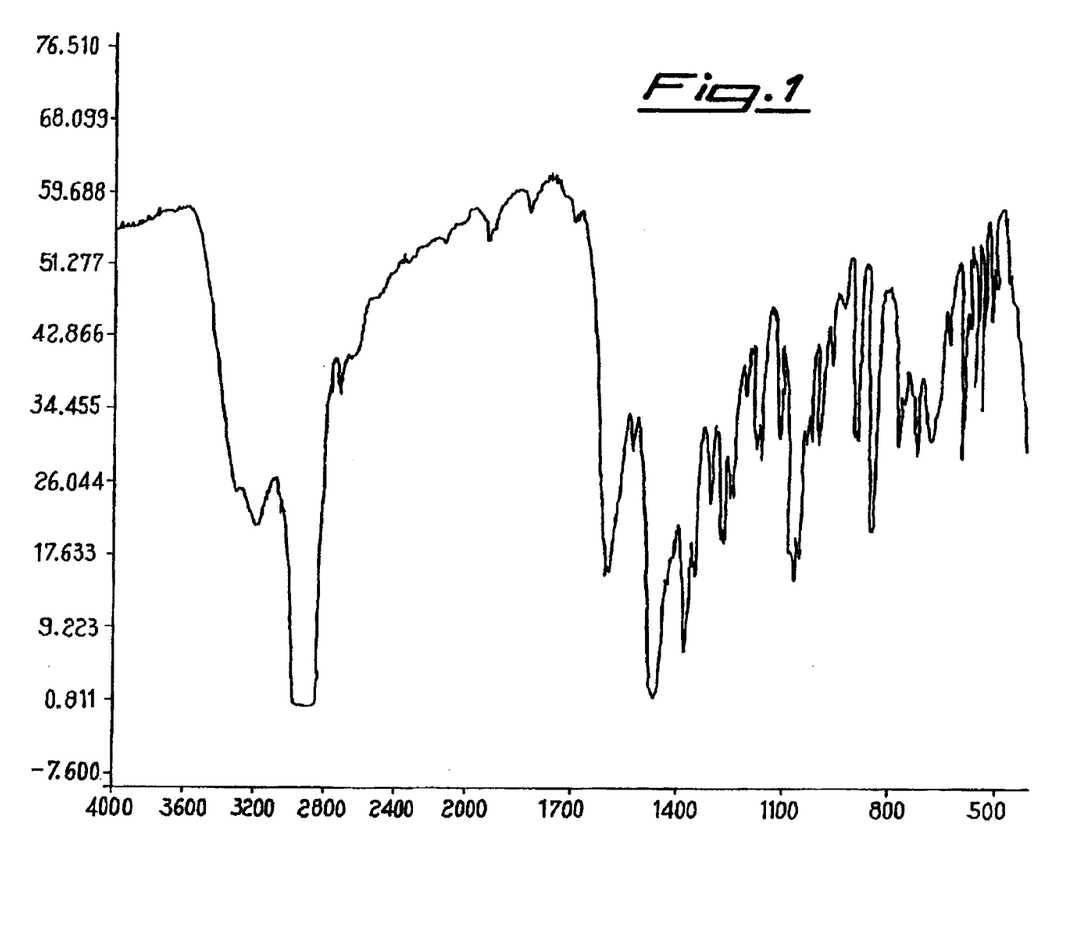
FIG. 1: IR spectrum of the N,N-(2-hydroxyethyl)-4-t-butylbenzamide obtained as described in Example 1.

FIG. 1 shows the infrared spectrum of the N,N-(2-hydroxyethyl)-4-t-butylbenzamide (in Nujol) prepared as described above, recorded between 4000 and 400 cm$^{-1}$.

EXAMPLE 2

Preparation of N,N-(2-hydroxyethyl)-4-t-butylbenzamide of formula (II) in which R is 4-t-butyl 192.2 g (1 mol) of methyl 4-t-butylbenzoate and 131 g (1.25 mol) of diethanolamine are suspended in 100 g of toluene; then 12.5 g of a 30% solution of sodium methylate in methanol are added.

The product is allowed to react for approximately 30 hours under stirring at a temperature of 30–35° C., from time to time creating vacuum in the apparatus to cause the methanol to evaporate. In this way, an abundant precipitate of amide is obtained, to which a further 100 g of toluene are added to improve stirring. Next, the product is cooled down to 4–5° C., and the precipitate is filtered. On the precipitate, three washing are carried out, first with 100 g of toluene and then twice with a total of 400 g of water, until the content of impurities consisting of diethanolamine is brought below 0.1%. The solid product is vacuum-dried at 50–60° C. to obtain 240 g of a crystalline solid which is found to be N,N-(2-hydroxyethyl)-4-t-butylbenzamide (melting point: 88.5–90° C.).

EXAMPLE 3

Preparation of a powder paint comprising the mixture of cross-linking agents according to the present invention The powder paint was prepared mixing, in a mixer, the raw materials listed in the table below.

|  | Parts by weight |
| --- | --- |
| Carboxylated polyester resin Sirales PE 178 ® | 563 |
| Tetrafunctional cross-linking agent | 15 |
| Bifunctional cross-linking agent | 21 |
| Acrylic flow agent BYK 360/P ® | 12 |
| Benzoin | 2 |
| Titanium dioxide Kronos 2310 ® | 400 |

As tetrafunctional cross-linking agent, the N,N,N',N'-tetrakis-(2-hydroxyethyl) adipamide of formula (I) was used, whilst the bifunctional cross-linking agent was the N,N-(2-hydroxyethyl)-4-t-butylbenzamide of Example 1.

The mean functionality of the mixture of cross-linking agents was 2.7.

The mixture thus obtained was fed into a single-screw BUSS PLK 46 extruder.

The extrusion operating conditions were as follows:

temperature of jacket: 120° C.

extruder screw: not heated speed of extruder screw: 110 rpm.

After being cooled, the extrusion mass was ground and sifted so as to obtain a powder paint with particle size of less than 100 μm.

EXAMPLE 4 (COMPARISON)

Preparation of a powder paint containing the tetrafunctional β-hydroxyalkyl amide of formula (I) as cross-linking agent Operating as in Example 3, a powder paint was prepared having the following composition:

|  | Parts by weight |
| --- | --- |
| Carboxylated polyester resin Sirales PE 178 ® | 570 |
| Tetrafunctional cross-linking agent (I) | 30 |
| Acrylic flow agent BYK 360/P ® | 12 |
| Benzoin | 2 |
| Titanium dioxide Kronos 2310 ® | 400 |

The tetrafunctional cross-linking agent was the N,N,N',N'-tetrakis-(2-hydroxyethyl) adipamide of formula (I).

The extrusion, grinding and sieving operations were carried out as described in the foregoing Example 3.

EXAMPLE 5

Preparation of a powder paint comprising the mixture of cross-linking agents according to the present invention The preparation of Example 3 was repeated in the same operating conditions, using a different carboxylated polyester resin.

The composition of the powder paint is given in the table below:

|  | Parts by weight |
| --- | --- |
| Carboxylated polyester resin Sirales PE 278 ® | 585 |
| Tetrafunctional cross-linking agent | 20 |
| Bifunctional cross-linking agent | 15 |
| Acrylic flow agent BYK 360/P ® | 12 |
| Benzoin | 2 |
| Blanc fixe "F" | 100 |
| Titanium dioxide Kronos 2310 ® | 300 |

As tetrafunctional cross-linking agent the N,N,N',N'-tetrakis-(2-hydroxyethyl) adipamide of formula (I) was used, whilst the bifunctional cross-lining agent was the N,N-(2-hydroxy)-4-t-butylbenzamide of Example 1.

The mean functionality of the mixture of cross-linking agents was 3.0.

The extrusion, grinding and sieving operations were carried out as described in Example 3.

EXAMPLE 6 (COMPARISON)

Preparation of a powder paint containing the tetrafunctional β-hydroxyalkyl amide of formula (I) as cross-linking agent Operating as in Example 3, a powder paint was prepared having the following composition:

|  | Parts by weight |
| --- | --- |
| Carboxylated polyester resin Sirales PE 278 ® | 570 |
| Tetrafunctional cross-linking agent (I) | 30 |
| Acrylic flow agent BYK 360/P ® | 12 |
| Benzoin | 2 |
| Blanc fixe "F" | 100 |
| Titanium dioxide Kronos 2310 ® | 300 |

The tetrafunctional cross-linking agent was the N,N,N',N'-tetrakis-(2-hydroxyethyl) adipamide of formula (I).

The extrusion, grinding and sieving operations were carried out as described in Example 3.

EXAMPLE 7

Preparation of a powder paint comprising the mixture of cross-linking agents according to the present invention A powder paint having the same composition as the paint described in Example 3 was prepared modifying the extrusion conditions.

The operation conditions of the BUSS PLK 46 extruder were as follows:

temperature of jacket: 120° C.
extruder screw: not heated
speed of extruder screw: 54 rpm.

The grinding and sieving operations, instead, were carried out as described in Example 3.

EXAMPLE 8 (COMPARISON)

Preparation of a powder paint containing the tetrafunctional β-hydroxyalkylamide of formula (I) as cross-linking agent A powder paint having the same composition as that of the paint described in Example 4 was prepared modifying the extrusion conditions.

The operation conditions of the BUSS PLK 46 extruder were as follows:

temperature of jacket: 120° C.
extruder screw: not heated
speed of extruder screw; 54 rpm.

The grinding and seiving operations were carried out as described in Example 3.

EXAMPLE 9

Application of the paints prepared as in Examples 3–8 on an item

The powder paints obtained as described in Examples 3–8 were applied on UNICHIM steel sheets having a thickness of 0.5 mm using a WAGNER Mod. EPM 200 electrostatic piston with corona-discharge loading, with electrical field voltage of 60 kV. Thermosetting was carried out by putting the painted steel sheets in an air-circulation oven at a temperature of 180° C. for 20 minutes.

EXAMPLE 10

Determination of the critical thickness of the films obtained in Example 9 for the paints of Examples 3–6

Operating as described in Example 9, four specimens were prepared having thicknesses of from 50 to 150 μm, one for each one of the paints prepared according to Examples from 3 to 6. Then, using a SHEEN thickness gauge, Mod. SE 1000 FNS, the various thicknesses of the films were measured in the areas free from surface flaws and in the areas where the phenomenon of blistering appeared.

The results thus obtained are summarized in the table below, where for each film is indicated first the thickness of the areas free form flaws and then the thickness of the areas which presented flaws:

|  | Thickness (μm) |
| --- | --- |
| Paint of Example 3 | 140–150 |
| Paint of Example 4 (Comparison) | 80–90 |
| Paint of Example 5 | 130–140 |
| Paint of Example 6 (Comparison) | 90–100 |

EXAMPLE 11

Determination of the variation in viscosity during thermosetting the paints of Examples 3–6

The variation in viscosity during thermosetting of the powder paints prepared as described in Examples from 3 to 6 was measured using a DYNAMIC STRESS RHEOMETER DSR viscometer manufactured by RHEOMETRICS, operating isothermally at 150° C. with plate/plate disposition, in the "dynamic time sweep" mode with a stress of 500 Pa and a frequency of 1 Hz.

Figure 2:
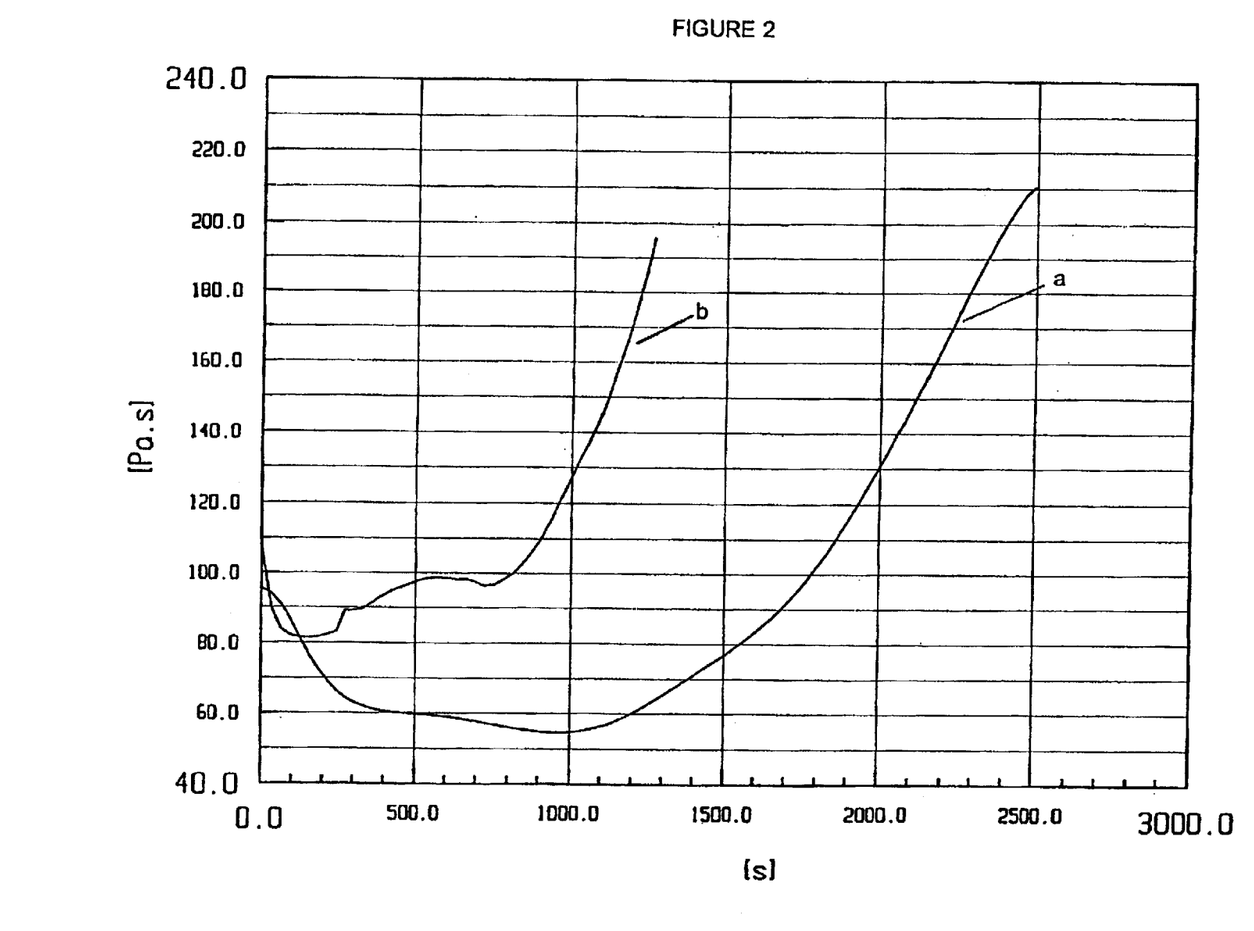
FIG. 2: Viscosimetric curves for the powder paints of Example 3 (curve a) and the paints of the comparison Example 4 (curve b), obtained by plotting on the graph the viscosity measured during hardening of the paint as a function of time as in Example 11.
Figure 3:
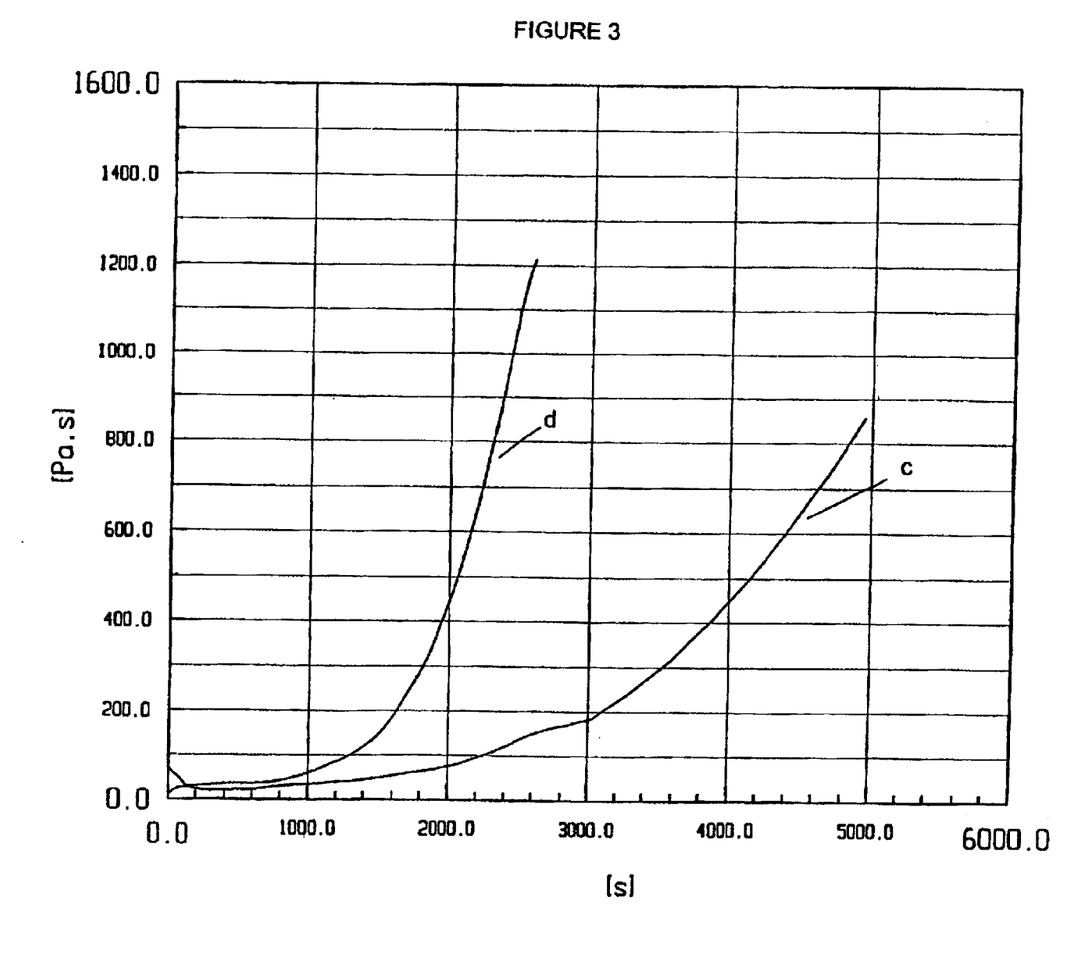
FIG. 3: Viscosimetric curves for the powder paints of Example 5 (curve c) and the paints of the comparison Example 6 (curve d), obtained by plotting on the graph the viscosity measured during hardening of the paint as a function of time as in Example 11.

The viscosity values thus measured for the paints of Examples 3 and 4 and for those of Examples 5 and 6 were plotted on a graph as a function of time, to obtain the viscosimetric curves shown in FIG. 2 and FIG. 3.

FIG. 2 shows the viscosimetric curves obtained for the paints of Examples 3 and 4. It may be noted that the paint of Example 3 comprising the mixture of cross-linking agents according to the present invention presents a level of viscosity which is considerably lower and which moreover is maintained for a much longer time than in the case of the paint containing only the tetrafunctional thermosetting agent prepared as described in the comparison Example 4, where the known technique is applied. The longer plastic life of the present paint thus favours the removal of the reaction water also for deeper film thicknesses.

The pattern of viscosity during thermosetting of the paints of Examples 5 and 6 is presented in FIG. 3. The paint of Example 5, which has a base of the mixture of cross-linking agents according to the present invention, has a viscosity upon melting which is lower during the film-formation step and, more important still, a plastic life which is longer than that of the paint containing only the tetrafunctional cross-linking agent of the prior art, prepared according to Example 6. This favours the expulsion of the reaction water also when small quantities of benzoin degassing agent are used.

EXAMPLE 12

Evaluation of the resistance to atmospheric agents of the paints of Examples 3–6.

Resistance to the so-called "weathering", i.e., to the action of atmospheric agents, was assessed for the paints prepared as described in Examples from 3 to 6 by means of an accelerated test according to the ASTM G 53–84 standards, operating with a QUV weatherometer manufactured by the firm Q-Panel.

The powder paints, which had been applied on chrome-plated aluminium panels manufactured by Q-Panel and had been subjected to thermosetting for 15 minutes at 180° C., were exposed to UVB 313 lamps with cycles of 4 hours of light and 4 hours of darkness with condensation. The temperatures recorded by the black panel were 60° C. during the period of light and 50° C. during the period of darkness with condensation. Ageing of the paints was assessed by measuring the loss of gloss during exposure over time, with an angle of incidence of light of 60°. The measurement was repeated with an angle of incidence of light of 20°. For the evaluation of gloss, a SHEEN glossimeter Mod. 155 was used.

Figure 4:
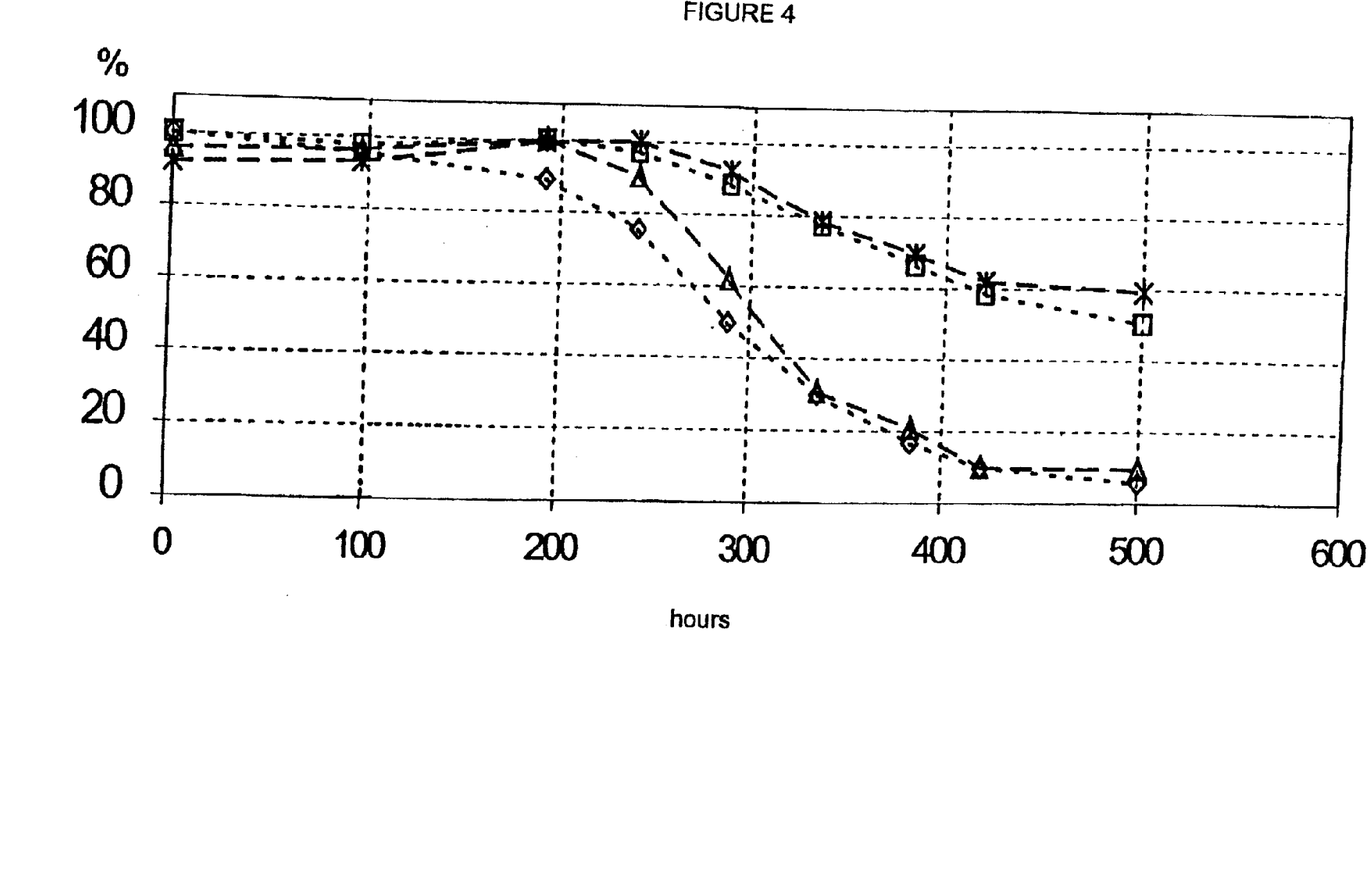
FIG. 4: Paint ageing, obtained by plotting on the graph gloss retention as a function of the time of exposure of the paint to the test according to the ASTM G 53–84 standards, as in Example 12.
Figure 5:
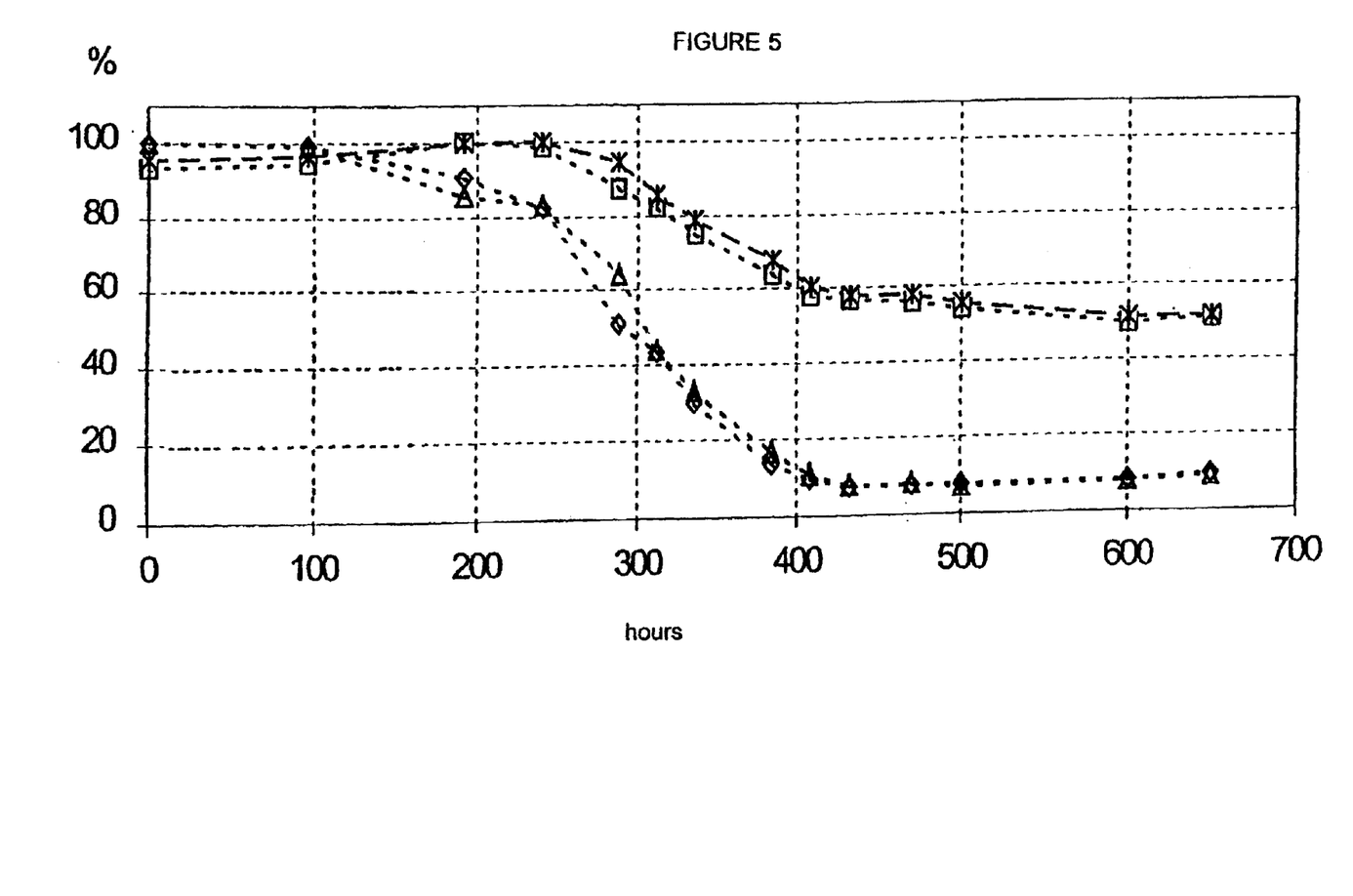
FIG. 5: paint ageing curves, obtained by plotting on the graph the percentage of gloss retention of as a function of the time of exposure of the paint to the test according to the ASTM G 53-84 standards, as in Example 12.

The graphs of FIGS. 4 and 5 give the values of percentage gloss retention, measured for angles of incidence of light of 60° and 20°, as a function of the exposure time expressed in hours, for the paints of Examples 3 and 4 and for those of Examples 5 and 6, respectively.

The results obtained, given in FIGS. 4 and 5, show that the use in powder paints of the cross-linking mixture according to the present invention does not substantially modify the resistance to atmospheric agents of the paints as compared to paints containing the tetrafunctional cross-linking agent alone.

EXAMPLE 13

Evaluation of the mechanical and aesthetic characteristics of the paints of Examples 3–8

The powder paints, which had been prepared as described in Examples from 3 to 6 and had undergone thermosetting for 20 minutes at 180° C. as described in Example 9, were subjected to the usual aesthetic evaluations and to determination of the mechanical characteristics according to international standards commonly applied in the sector of powder paints.

In particular, the thickness of the paint film was measured using a SHEEN thickness gauge, Mod. SE 1000 FNS, whilst gloss, measured at an angle of incidence of light of 60°, was evaluated according to the ASTM D 523 standards, using a SHEEN Mod. 155 instrument.

The white point was assessed according to the CIE LAB 76 standard, using a BYK Color View reflectance colorimeter.

The "cupping tester", used for measuring cupping according to the DIN 53156 standard was an Ericksen Mod. 229 instrument, whilst for the evaluation of front and reverse Gardner impact according to ASTM D2794 standards, an impact tester manufactured by BYK GARDNER was used.

The results, tabulated below, show that the use of the cross-linking mixture does not alter the above properties as compared to the paints of the prior art containing the tetrafunctional cross-linking agent alone.

|  | Example 3 | Example 4 (comparison) | Example 5 | Example 6 (comparison) |
| --- | --- | --- | --- | --- |
| Thickness (μm) | 60 | 65 | 65 | 70 |
| White point (CIE LAB 76) | 77 | 78 | 79 | 78 |
| Gloss at 60° (ASTM D 523) | 95 | 96 | 96 | 93 |
| Cupping(mm) | >9 | >9 | >9 | >9 |
| Front Gardner impact (N · m) | >10 | >10 | >10 | >10 |
| Reverse Gardner Impact (N · m) | >10 | >10 | >10 | >10 |

The paints of Examples 5 and 6, when subjected to mechanical and aesthetic characterization as in the case of Examples 3 and 4, did not reveal any differences when the mixture of thermosetting agents was used.

The mechanical and aesthetic characteristics of the films prepared according to Examples 9 for the paints of Examples 7 and 8 were assessed as described above, and the corresponding results are summarized in the table below.

|  | Example 7 | Example 8 (comparison) |
| --- | --- | --- |
| Thickness (μm) | 65 | 60 |
| White point (CIE LAB 76) | 76 | 78 |
| Gloss at 60° (ASTM D 523) | 94 | 92 |
| Cupping (mm) | >9 | >9 |
| Front Gardner impact (N · m) | >10 | 4 |
| Reverse Gardner impact (N · m) | >10 | 1 |

These results show that the decrease in mechanical energy during the extrusion phase in the preparation of powder paint does not affect and mixing of the polyester resin with the cross-linking mixture of the present invention, and indeed the spread of the paint of Example 7 remains practically unvaried as compared to that of the paints of Examples 3 and 5.

On the contrary, use of low mechanical energy during extrusion results in poor mixing of the polyester resin with the tetrafunctional cross-linking agent of formula (I) in the paint of the known art prepared as described in Example 8, and this poor mixing causes a worsening of the mechanical characteristics. Also the aesthetic appearance of the paints of Example 8 is found to be poor as compared to that of the paints of Examples 3, 5 and 7, in that it presents the "orange peel" phenomenon to a large extent.

What is claimed is:

1. A cross-linking mixture for polymers having free carboxyl groups, suitable for the preparation of powder paints, comprising at least one Beta-hydroxyalkylamide compound having a Beta-hydroxy functionality of 4 and at least one compound of formula (II)

(II)

where R is linear or branched $C_2$–$C_{10}$ alkyl group having a Beta-hydroxy functionality of 2, wherein said cross-linked mixture has a mean Beta-hydroxy functionality of between 2.1 and 3.9.

2. The cross-linking mixture according to claim 1, wherein said means Beta-hydroxy functionality ranges between 2.2 and 3.8.

3. The cross-linking mixture according to claim 1, wherein said Beta-hydroxyalkylamide compound comprises [N,N,N',N'-tetrakis-(2-hydroxyethyl)adipamide] of formula (I)

(I)

4. The cross-linking mixture according to claim 3, wherein in said compound of formula (II) R is selected from the group consisting of t-butyl, i-propyl and pentyl.

5. The cross-linking mixture according to claim 3, wherein in said compound of formula (II) R is a t-butyl group in the para-position with respect to the carbonyl.

6. A thermosetting powder paint, which comprises the mixture according to claim 1 as the cross-linking agent and at least one polymer having free carboxyl groups as the binder.

7. A substrate coated with the powder paint according to claim 6.

8. The thermosetting powder paint according to claim 6, wherein said polymer having free carboxyl groups is a carboxylated polyester resin.

9. The thermosetting powder paint according to claim 8, wherein said carboxylated polyester resin has a numeric mean molecular weight of between 1000 and 6000, an acid number of between 15 and 100 mg of KOH/g of resin, and a glass transition temperature of between 35 and 90° C.

10. The thermosetting powder paint according to claim 9, wherein said carboxylated polyester resin has a numeric mean molecular weight of between 2000 and 3500, an acid number of between 25 and 50 mg of KOH/g of resin, and a glass transition temperature of between 50 and 70° C.

11. The thermosetting powder paint according to claim 6, wherein the molar ratio between the total Beta-hydroxyl groups of said cross-linking mixture and the carboxyl groups of said polymer is between 2:3 and 3:2.

12. A process for the preparation of the powder paint according to claim 6, which comprises the following steps:
    (i) mixing the binder with the cross-linking agents, and optionally with mineral charges, additives and pigments, in a mixer;
    (ii) feeding the mixture obtained in step (i) into an extruder, at temperatures of between 80 and 140° C., with the extruder screw not heated and screw speed lower than 120 rpm;
    (iii) grinding and sieving the product obtained from the extruder so as to obtain powder paint with a particles size of less than 150 µm.

13. The process according to claim 12, wherein in step ii) the said speed of the extruder screw is lower than 60 rpm.

14. The process according to claim 12, wherein said cross-linking agents are intimately pre-mixed together and added in step i) as a mixture.

15. The process according to claim 12, wherein the particle size of the paint obtained in step ii) is smaller than 100 µm.

* * * * *